(12) United States Patent
Kim et al.

(10) Patent No.: US 11,332,192 B2
(45) Date of Patent: May 17, 2022

(54) VEHICLE BODY

(71) Applicants: Hyundai Motor Company, Seoul (KR); Kia Motors Corporation, Seoul (KR)

(72) Inventors: Ho Yeon Kim, Daegu (KR); Chul Hee Heo, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 124 days.

(21) Appl. No.: 16/931,189

(22) Filed: Jul. 16, 2020

(65) Prior Publication Data

US 2021/0171101 A1 Jun. 10, 2021

(30) Foreign Application Priority Data

Dec. 5, 2019 (KR) .................. 10-2019-0160985

(51) Int. Cl.
| | | |
|---|---|---|
| *B62D 25/02* | (2006.01) | |
| *B62D 21/02* | (2006.01) | |
| *B60G 7/02* | (2006.01) | |
| *B62D 33/06* | (2006.01) | |
| *B62D 33/02* | (2006.01) | |

(52) U.S. Cl.
CPC ............ *B62D 21/02* (2013.01); *B60G 7/02* (2013.01); *B62D 33/02* (2013.01); *B62D 33/06* (2013.01); *B60G 2204/143* (2013.01); *B60G 2300/13* (2013.01)

(58) Field of Classification Search
CPC ........ B62D 21/02; B62D 33/02; B62D 33/06; B60G 7/02; B60G 2204/143; B60G 2300/13
See application file for complete search history.

(56) References Cited

U.S. PATENT DOCUMENTS

| | | | |
|---|---|---|---|
| 4,325,448 A | 4/1982 | Pivar | |
| 4,660,345 A | 4/1987 | Browning | |
| 5,209,541 A * | 5/1993 | Janotik | B62D 23/005 |
| | | | 280/785 |
| 5,332,281 A | 7/1994 | Janotik et al. | |

(Continued)

FOREIGN PATENT DOCUMENTS

| | | |
|---|---|---|
| DE | 102005026791 A1 | 1/2007 |
| EP | 1329374 A1 | 7/2003 |

(Continued)

OTHER PUBLICATIONS

U.S. Appl. No. 16/928,346.

(Continued)

*Primary Examiner* — Toan C To
(74) *Attorney, Agent, or Firm* — Slater Matsil, LLP

(57) ABSTRACT

A vehicle body includes a cross connecting member formed in a transverse direction of the vehicle body and having branch parts branched from its outer surface, and a joint housing having a tubular shape that is fitted to and surrounds the branch parts so that the joint housing is fastened to an end of the cross connecting member, the joint housing having member fastening parts extending from portions into which the branch parts are fitted so that frame members are fastened to the member fastening parts.

20 Claims, 10 Drawing Sheets

(56) References Cited

U.S. PATENT DOCUMENTS

| | | | | |
|---|---|---|---|---|
| 5,549,352 | A | * | 8/1996 | Janotik ............... B62D 21/02 296/203.01 |
| 5,829,219 | A | * | 11/1998 | Sugawara ............ B21C 37/29 52/653.2 |
| 6,022,070 | A | * | 2/2000 | Ashina ............... B62D 23/005 296/205 |
| 6,042,163 | A | * | 3/2000 | Reiffer ............... B60R 19/18 293/102 |
| 6,099,084 | A | * | 8/2000 | Bungarten ........... B60B 35/08 280/124.166 |
| 6,241,310 | B1 | | 6/2001 | Patelczyk |
| 6,318,775 | B1 | * | 11/2001 | Heatherington ..... B60R 19/18 293/120 |
| 6,695,368 | B1 | | 2/2004 | Weykamp et al. |
| 6,869,136 | B2 | * | 3/2005 | Igarashi ............. B62D 27/023 296/204 |
| 6,926,350 | B2 | | 8/2005 | Gabbianelli et al. |
| 7,001,097 | B2 | * | 2/2006 | Wang ................ F16B 9/09 403/231 |
| 7,386,938 | B2 | * | 6/2008 | Bruggemann ...... B62D 23/005 29/421.1 |
| 7,758,107 | B2 | | 7/2010 | Ratsos et al. |
| 8,371,642 | B2 | * | 2/2013 | Baccouche ......... B62D 25/04 296/203.01 |
| 8,640,814 | B2 | * | 2/2014 | Deckard ............. B60R 21/13 180/312 |
| 9,505,293 | B2 | | 11/2016 | Bowles et al. |
| 9,849,920 | B2 | | 12/2017 | Kawata et al. |
| 10,618,489 | B2 | | 4/2020 | Hisamura et al. |
| 10,686,304 | B2 | * | 6/2020 | Wagner, III ........ F16L 25/0018 |
| 2001/0000119 | A1 | | 4/2001 | Jaekel et al. |
| 2006/0059807 | A1 | | 3/2006 | Zimmerman et al. |
| 2006/0192375 | A1 | | 8/2006 | Davis et al. |
| 2009/0121106 | A1 | | 5/2009 | An |
| 2013/0277137 | A1 | | 10/2013 | Kawaguchi et al. |
| 2015/0252586 | A1 | | 9/2015 | Schaefer |
| 2015/0259011 | A1 | * | 9/2015 | Deckard ............ B62D 33/0625 280/781 |
| 2015/0298739 | A1 | * | 10/2015 | Buschjohann ....... B62D 29/008 296/193.08 |
| 2017/0136874 | A1 | | 5/2017 | Harris et al. |
| 2019/0208741 | A1 | | 7/2019 | Huthmaker et al. |
| 2021/0171125 | A1 | | 6/2021 | Yong et al. |

FOREIGN PATENT DOCUMENTS

| | | | | |
|---|---|---|---|---|
| FR | 2822431 | A1 | | 9/2002 |
| GB | 2508075 | A | * | 5/2014 ............. B62D 21/02 |
| JP | H0411581 | A | | 1/1992 |
| JP | 2013208968 | A | | 10/2013 |
| KR | 100243584 | B1 | | 3/2000 |
| KR | 20090035148 | A | | 4/2009 |
| WO | 2010071664 | A1 | | 6/2010 |

OTHER PUBLICATIONS

U.S. Appl. No. 16/929,663.
U.S. Appl. No. 16/929,426.
U.S. Appl. No. 16/989,326.
U.S. Appl. No. 16/928,511.
U.S. Appl. No. 16/929,604.
U.S. Appl. No. 16/928,381.

* cited by examiner

VEHICLE BODY

CROSS-REFERENCE TO RELATED APPLICATIONS

This application claims priority to Korean Patent Application No. 10-2019-0160985, filed on Dec. 5, 2019, which application is hereby incorporated herein by reference.

TECHNICAL FIELD

The present disclosure relates to a vehicle body.

BACKGROUND

Conventional compact vehicles have a monocoque body structure in which only a rear door is cut out of a typical vehicle design.

However, such a typical rear-door-removed monocoque body structure is disadvantageous in that it has a low degree of freedom of design in addition to requiring large-scale investments in equipment such as press plants, body welding plants, and painting plants since the monocoque body structure is made by machining and welding parts with press working using molds.

Moreover, an existing vehicle body requires a large number of changes in design at the time of small quantity batch production, which may lead to an increase in cost of production as well as to a difficulty in securing body rigidity due to a rapid increase in the number of molds.

In addition, in order to realize an eco-friendly/smart factory environment, the conventional welding may not be adopted between the constituent members of the vehicle body. In particular, since a very small vehicle has an extreme short-overhang, the collision load absorbed by the layout of an existing vehicle engine room is more likely to be transferred to the passenger compartment of the very small vehicle (safety zone).

Accordingly, a new body structure is required that can be assembled in an improved manner in a smart factory environment while coping with various designs, and in particular, that enables main connections between members to have higher coupling strength and rigidity.

The foregoing is intended merely to aid in the understanding of the background of the present disclosure, and is not intended to mean that the present disclosure falls within the purview of the related art that is already known to those skilled in the art.

SUMMARY

Accordingly, the embodiments of the present disclosure have been made keeping in mind problems occurring in the related art. The present disclosure relates to a vehicle body. Particular embodiments relate to a vehicle body that can be simply assembled while enabling connections between members to have strength and rigidity.

In accordance with an embodiment of the present disclosure, there is provided a vehicle body that includes a cross connecting member formed in a transverse direction and having branch parts branched from its outer surface, and a joint housing having a tubular shape that is fitted to and surrounds the branch parts so that the joint housing is fastened to an end of the cross connecting member, the joint housing having member fastening parts extending from its portion into which the branch parts are fitted so that frame members are fastened to the member fastening parts.

The joint housing may have fastening guide grooves formed on its inner surface so as to correspond to outer surfaces of the branch parts, so that the branch parts are fitted into the fastening guide grooves.

Each of the branch parts and an associated one of the fastening guide grooves may have concave and convex portions or convex and concave portions formed on the outer surface of the branch part and the inner surface of the fastening guide groove, respectively, the concave and convex portions or the convex and concave portions corresponding to and being fitted to each other.

At least one of the branch parts may have a center concave portion recessed from the center of its end and an associated one of the fastening guide grooves may have a center convex portion protruding from its inner surface and corresponding to the center concave portion. Each of the other(s) of the branch parts may have side convex portions extending from both sides of its end and an associated one of the fastening guide grooves may have side concave portions recessed from its inner surface and corresponding to the side convex portions.

The cross connecting member may be hollow and have a boss formed transversely at the center of the hollow, an internal reinforcement rib may be formed between the boss and an inner surface of the cross connecting member, and a fastening means may be fastened to the center of the boss by passing through the joint housing.

One end of the internal reinforcement rib may be connected to an outer peripheral surface of the boss and the other end of the internal reinforcement rib may be connected between the branch parts adjacent to each other.

Each of the frame members may have a tubular shape that is closed in cross-section or may have a tubular shape that is open at one surface thereof. Each of the member fastening parts may have a tubular shape that is closed in cross-section, so that the frame member is fitted into the associated member fastening part. A fastening means may be fastened to the side of the frame member by passing through the side of the member fastening part.

An external reinforcement rib may be formed between the member fastening parts adjacent to each other.

A portion of an inner wall of the joint housing facing the outer surface of the cross connecting member may be spaced apart from the cross connecting member, thereby defining a first buffer space.

An inner wall of the joint housing surrounding the branch parts may be spaced apart from an outer wall of the joint housing forming bottom surfaces of the member fastening parts, thereby defining a second buffer space.

The cross connecting member may gradually increase in cross-sectional size from the center thereof toward both ends thereof.

As is apparent from the above description, the embodiments of the present disclosure have an effect of enhancing the coupling rigidity and strength of the main connections required for the connection rigidity and strength of the vehicle by fitting the cross connecting member into the joint housing while branching the cross connecting member and the joint housing toward the individual members that are fitted thereinto so that the main connections of the vehicle body are interconnected by fitting and jointing.

In addition, by assembling the members connected to the joint housing as well as the cross connecting member including the cowl member by bolting or riveting, large-scale equipment such as press plants, body welding plants, and painting plants is unnecessary. Therefore, it is possible to cope with the smart factory environment and of course to simplify the assembly of the vehicle body for an improvement in assembly capability. In addition, it is possible to significantly enhance the torsional rigidity of the assembled parts and to maintain the strength and rigidity of the vehicle body.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION OF ILLUSTRATIVE EMBODIMENTS

Reference will now be made in detail to preferred embodiments of the present disclosure, examples of which are illustrated in the accompanying drawings.

In embodiments of the present disclosure, a cross connecting member 100 and a joint housing 200 may be applied to main connections between the constituent members of the frame of a vehicle body 1, and a large number of members are organically interconnected for partial modules that are interconnected to form the vehicle body 1.

In particular, the joint housing 200 is connected to a connection required for relatively high strength and rigidity, from among the connections of the members, thereby enabling that connection to have high strength and rigidity.

Figure 1:
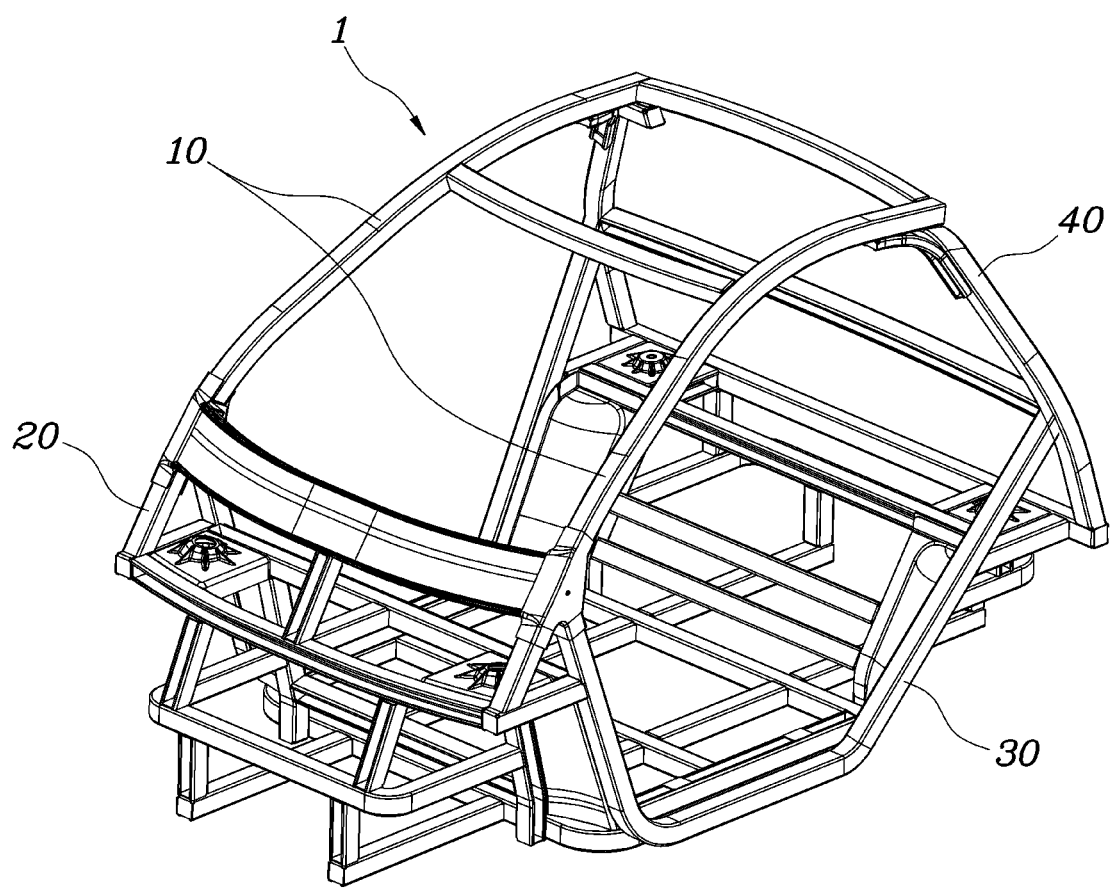
FIG. 1 is a view illustrating a vehicle body before application of a cross connecting member and a joint housing thereto according to embodiments of the present disclosure.
Figure 2:
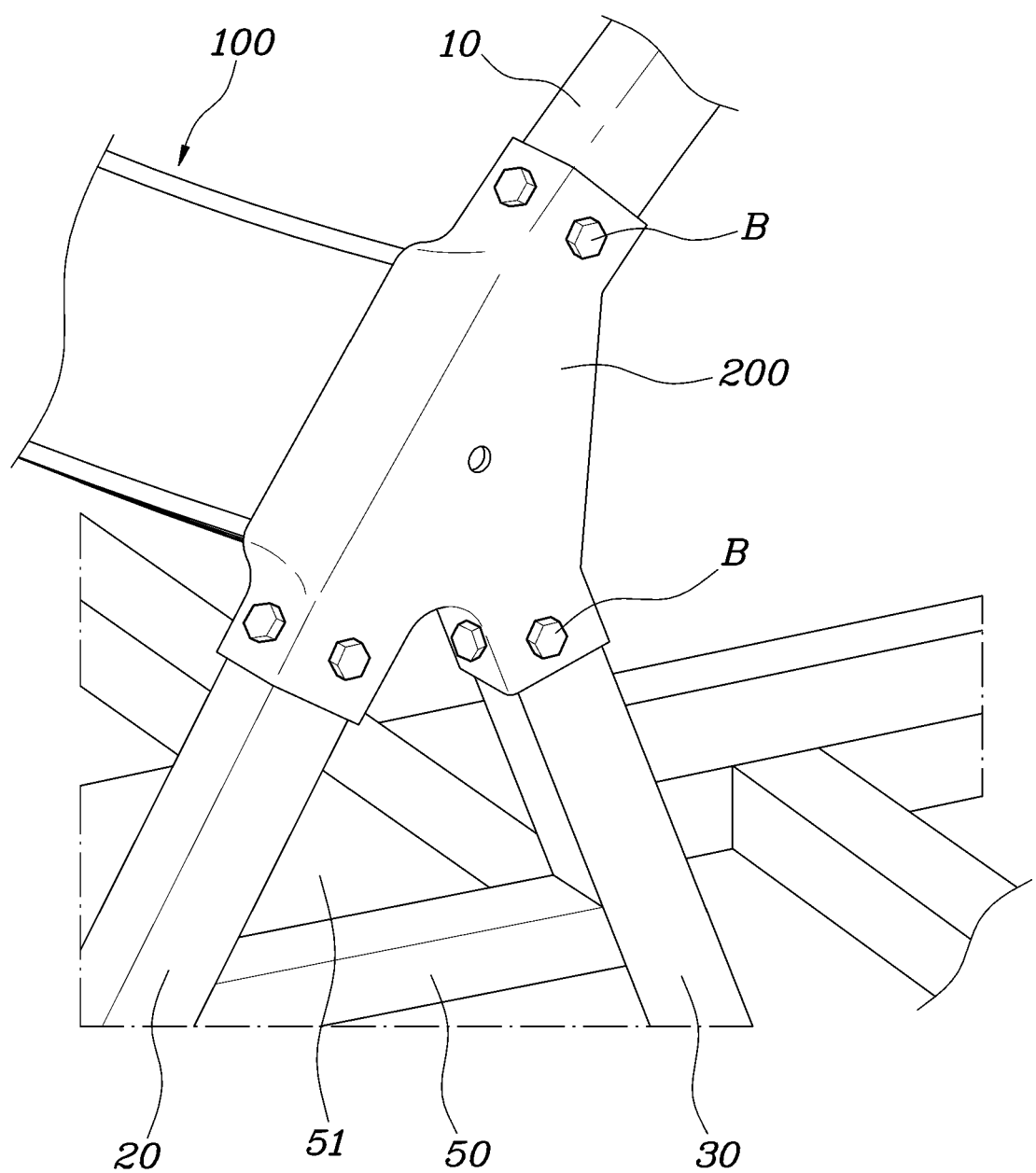
FIG. 2 is an enlarged view illustrating connections of the cross connecting member and the joint housing according to embodiments of the present disclosure.

FIG. 1 is a view illustrating the vehicle body 1 before application of the cross connecting member 100 and the joint housing 200 thereto according to embodiments of the present disclosure. FIG. 2 is an enlarged view illustrating connections of the cross connecting member 100 and the joint housing 200 according to embodiments of the present disclosure.

That is, the cross connecting member 100 and the joint housing 200 illustrated in FIG. 2 may be applied to the vehicle body 1 illustrated in FIG. 1.

Referring to the drawings, the cross connecting member 100 is formed in the transverse direction of the vehicle body 1 and has branch parts 110 branched in an upward-rearward direction and downward-forward-and-rearward directions from the outer surface thereof.

The joint housing 200 has a tubular shape that is fitted to and surrounds the ends of the respective branch parts 110, so that the joint housing 200 is fastened to each end of the cross connecting member 100. The joint housing 200 has member fastening parts 220 extending outward from its portion into which the branch parts no are fitted, so that frame members are fastened to the member fastening parts 220.

Figure 9:
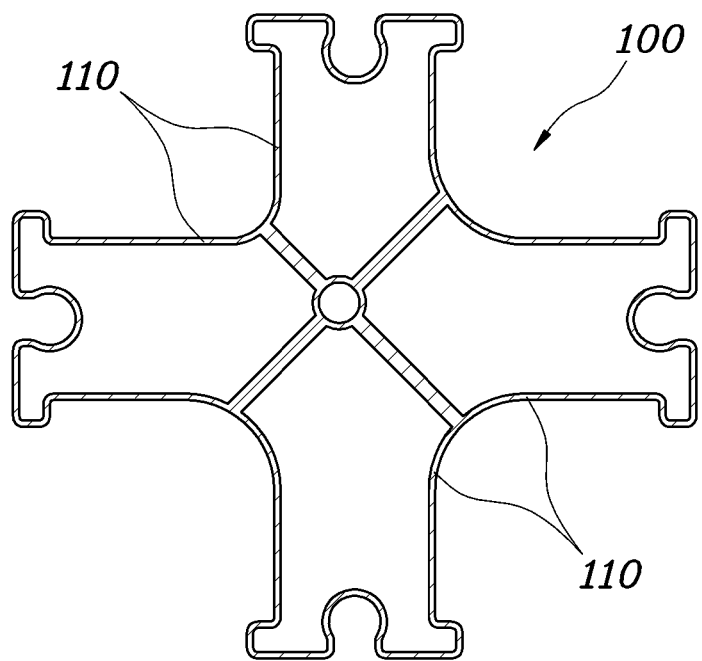
FIG. 9 is a view illustrating a cross connecting member according to another embodiment of the present disclosure.

For example, the cross connecting member 100 is made of an aluminum material and by extrusion molding, and has the branch parts no formed in three directions on the circumferential surface thereof, wherein the branch parts no generally protrude in a transverse direction. Thus, the rigidity and strength of the entire cross connecting member 100 are secured. The cross connecting member 100 may have a different shape depending on the portion where the cross connecting member 100 is applied. For example, the cross connecting member 100 illustrated in FIG. 9 may have branch parts 110 formed in all directions.

The cross connecting member 100 gradually increases in cross-sectional size from its center toward both of its ends, so that the cross connecting member 100 can have connection rigidity at both ends thereof.

Alternatively, the cross connecting member 100 may be a cowl member connected laterally to the lower end of a windshield in the front of a vehicle.

When the cross connecting member 100 is the cowl member described above, the frame members connected to the joint housing 200 may be a front pillar member 10, which extends upward from the front of the vehicle toward a roof to be coupled thereto, a cowl connecting member 20, which is connected to a suspension mount 51 in the front of the vehicle and extends upward toward the joint housing 200 to be coupled thereto, and a side reinforcement member 30 which is connected to the side of the center floor on the bottom of the vehicle and leads from the front of the vehicle to the rear thereof.

Figure 7:
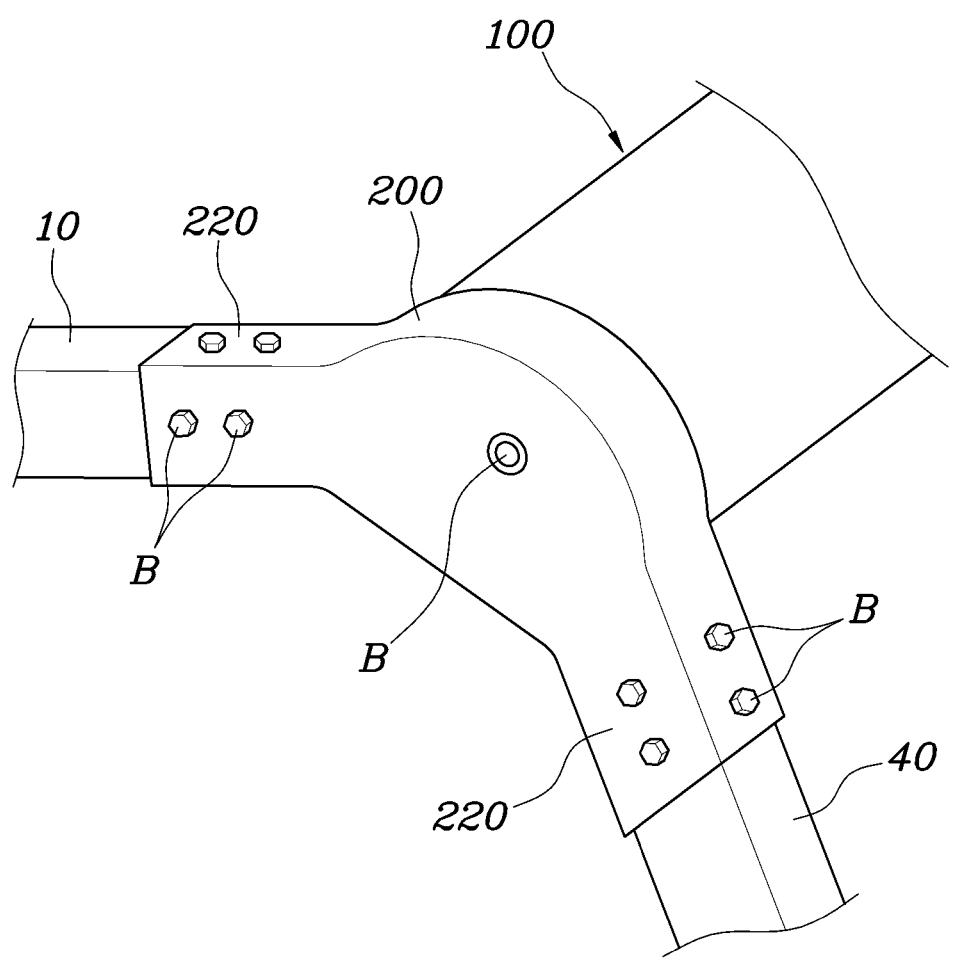
FIG. 7 is a view illustrating a state in which a cross connecting member and a joint housing are applied to a connection between a front pillar member and a rear pillar member according to an embodiment of the present disclosure.
Figure 8:
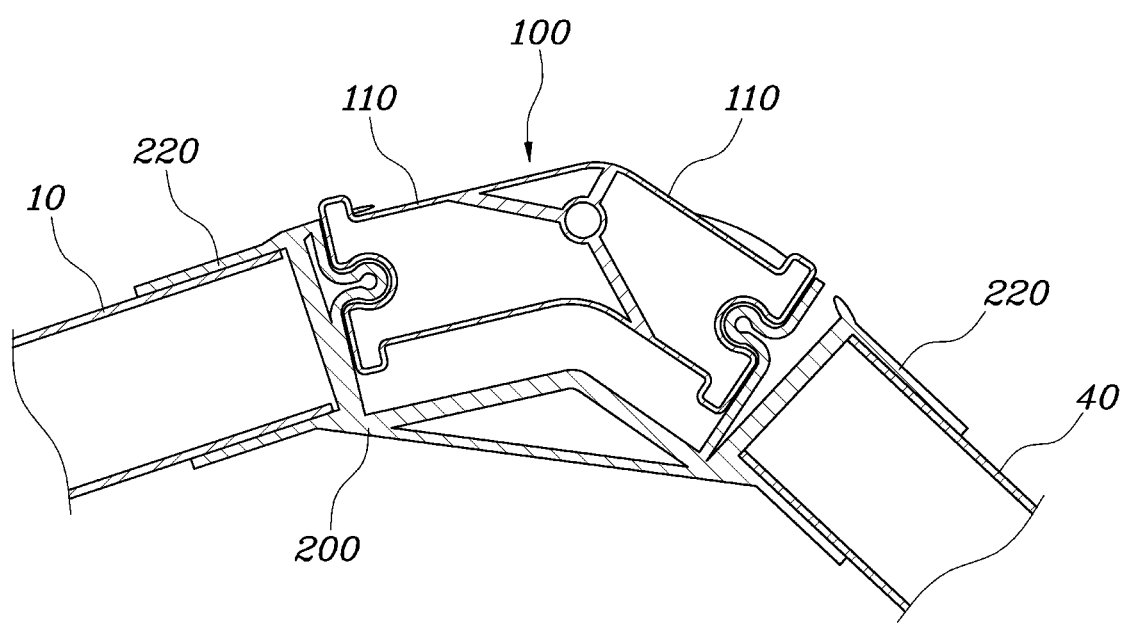
FIG. 8 is a cross-sectional view of FIG. 7.

Of course, the cross connecting member 100 may be a different main connection required for the rigidity and strength of the vehicle body 1, in addition to the cowl member. For example, the cross connecting member 100 may be a rear roof member connected laterally between a front pillar member 10 and a rear pillar member 40 as illustrated in FIGS. 7 and 8.

When the cross connecting member 100 is the rear roof member described above, the frame members connected to the joint housing 200 may be a front pillar member 10, which extends upward from the front of the vehicle toward the roof to be coupled thereto, and a rear pillar member 40 which extends upward from the rear of the vehicle toward the roof to be coupled thereto.

As described above, in embodiments of the present invention, particularly the cross connecting member 100, from among the main connections required for the connection rigidity and strength of the vehicle, traversing the vehicle body 1 is branched in cross-section in directions in which the frame members are fitted into the joint housing 200, the cross connecting member 100 is fitted into the joint housing 200, and the frame members are fitted into the joint housing 200. In this way, the main connections of the vehicle body 1 are interconnected by fitting and jointing, thereby enabling the coupling rigidity and strength of those connections to be increased.

Figure 3:
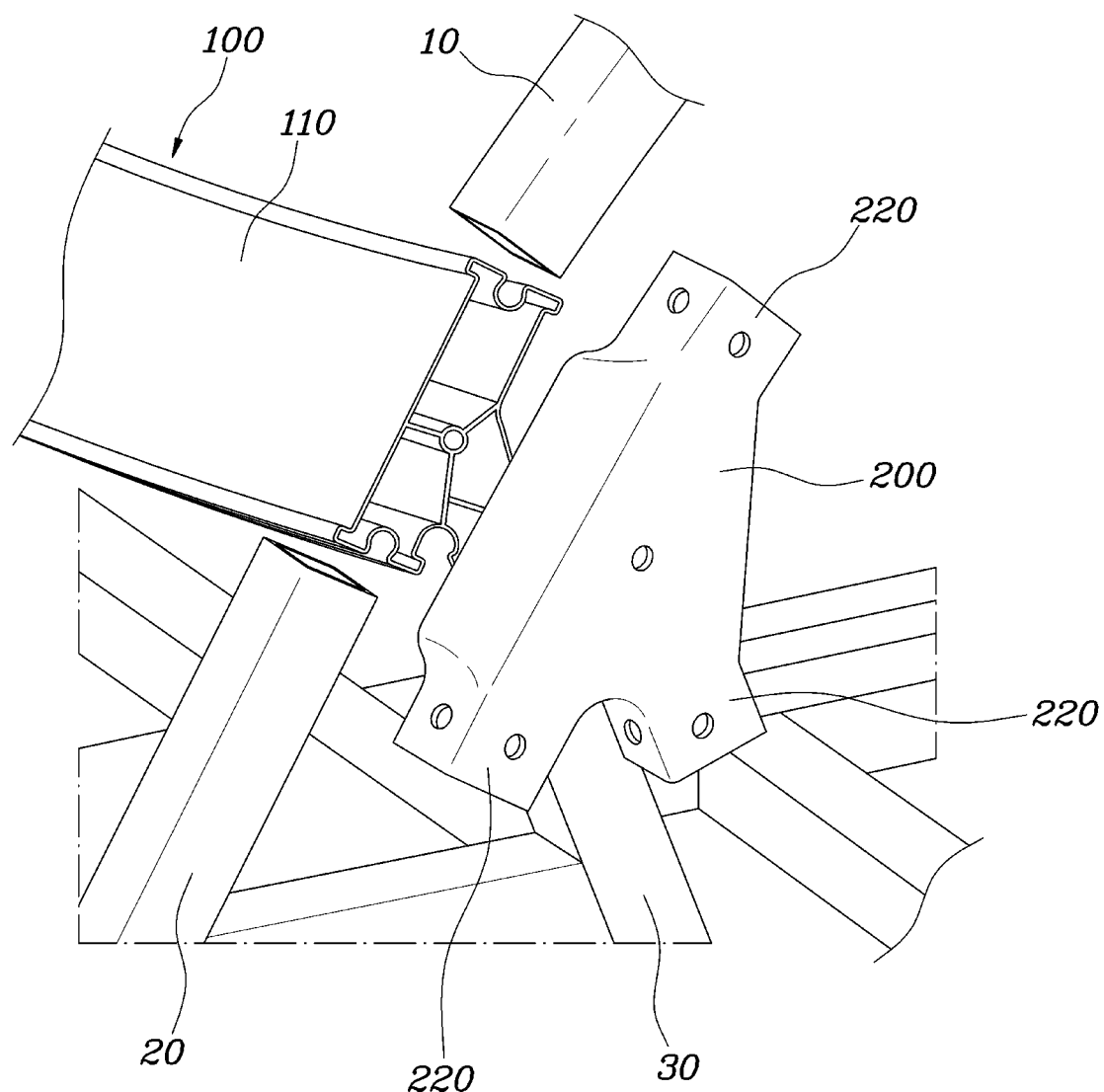
FIG. 3 is an exploded view of parts at the connections illustrated in FIG. 2.
Figure 4:
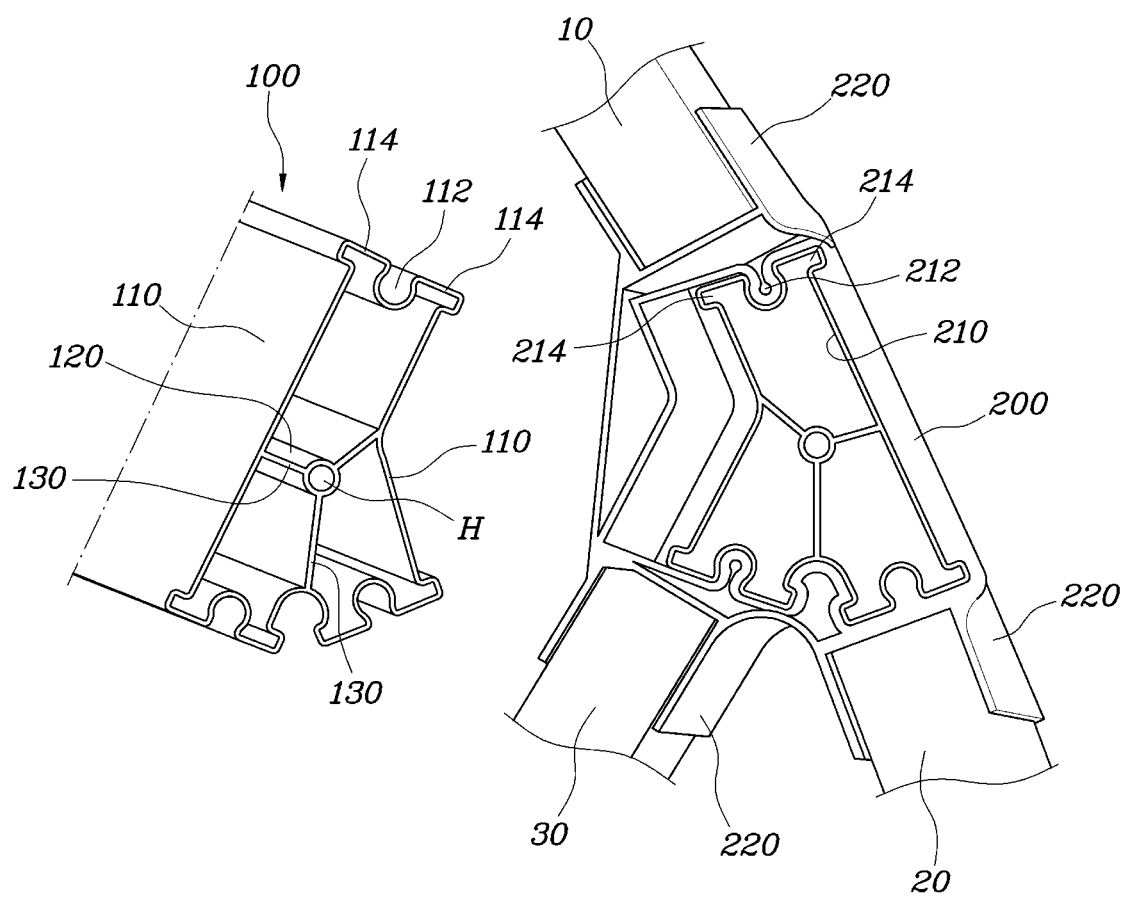
FIG. 4 is a view for explaining a fastening structure of the cross connecting member and the joint housing according to embodiments of the present disclosure.

FIG. 3 is an exploded view of parts at the connections illustrated in FIG. 2. FIG. 4 is a view for explaining a fastening structure of the cross connecting member 100 and the joint housing 200 according to embodiments of the present disclosure.

Referring to the drawings, the joint housing 200 has fastening guide grooves 210 formed on the inner surface thereof so as to correspond to the outer surfaces of the branch parts no, so that the branch parts no are fitted into the fastening guide grooves 210.

For example, the joint housing 200 is formed by die casting according to the strength and rigidity specifications required for the main connections of the vehicle body 1, and the fastening guide grooves 210 may be formed on one inner surface of the joint housing 200 so as to correspond to the cross-sectional shape of the cross connecting member 100. However, a portion of the inner surface of each fastening guide groove 210 and a portion of the outer surface of the cross connecting member 100 may be spaced apart from each other to define a buffer space which will be described later. A description thereof will be given again below.

As described above, the cross connecting member 100 is assembled to the joint housing 200 in such a manner that the end of the cross connecting member 100 slides and is fitted to the inner surface of the joint housing 200. Thus, it is possible to enhance the fastening force between the cross connecting member 100 and the joint housing 200 and to ensure the torsional rigidity of the corresponding connection.

Figure 5:
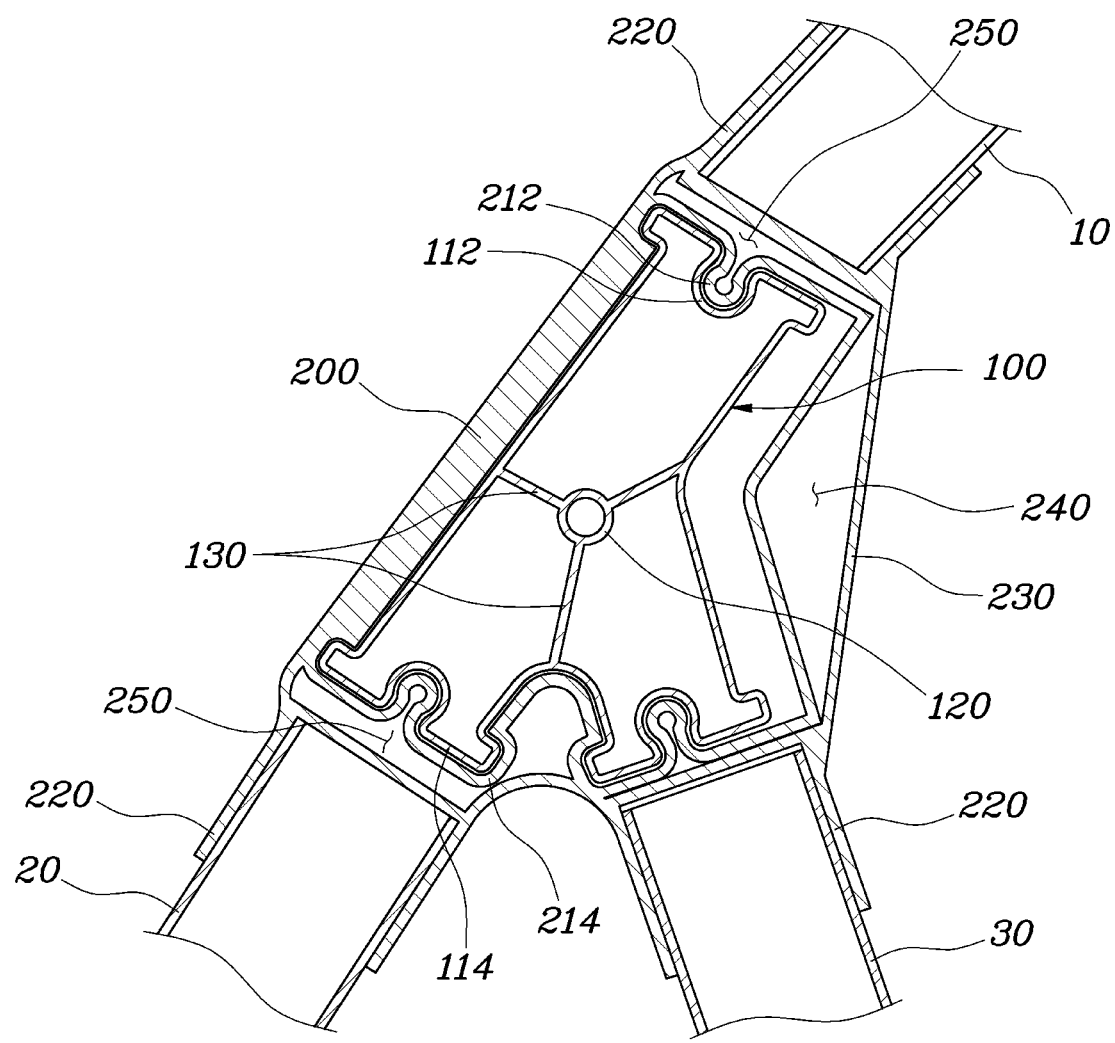
FIG. 5 is a cross-sectional view illustrating a state in which the cross connecting member is fastened to the joint housing according to embodiments of the present disclosure.

FIG. 5 is a cross-sectional view illustrating a state in which the cross connecting member 100 is fastened to the joint housing 200 according to embodiments of the present disclosure.

Referring to the drawing, each of the branch parts no and the associated fastening guide groove 210 may have concave and convex portions or convex and concave portions formed on the outer surface of the branch part 110 and the inner surface of the fastening guide groove 210, respectively, so that the concave and convex portions or the convex and concave portions correspond to and are fitted to each other.

Specifically, one of the branch parts 110 has a "Ω"-shaped center concave portion 112 recessed from the center of the end thereof and the associated fastening guide groove 210 has a "Ω"-shaped center convex portion 212 protruding from the inner surface thereof and corresponding to the center concave portion 112, so that the center convex portion 212 is fitted into the center concave portion 112.

Each of the others of the branch parts 110 has side convex portions 114 extending laterally from both sides of the end thereof and the associated fastening guide groove 210 has side concave portions 214 recessed from the inner surface thereof and corresponding to the side convex portions 114, so that the side convex portions 114 are fitted into the side concave portions 214.

That is, when the cross connecting member 100 is coupled to the joint housing 200, the concave and convex portions thereof slide relative to each other and are fitted to each other. Thus, it is possible to increase the fastening force and thus torsional rigidity between the cross connecting member 100 and the joint housing 200. In addition, since the protruding circular width of the center convex portion 212 is larger than the inlet width of the center concave portion 112, it is possible to prevent the decoupling of the center convex portion 212 from the center concave portion 112 and to further enhance the connection rigidity and strength of that connection.

Figure 6:
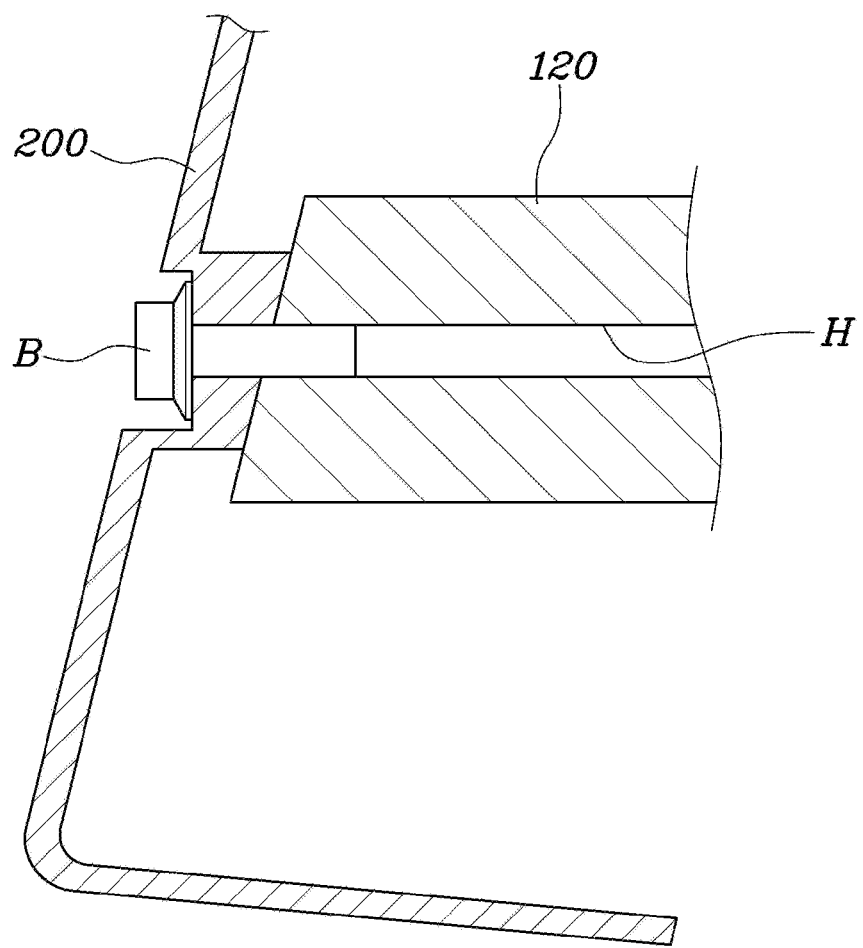
FIG. 6 is a cross-sectional view illustrating a state in which the cross connecting member is fastened to the joint housing by a fastening means therethrough according to embodiments of the present disclosure.

FIG. 6 is a cross-sectional view illustrating a state in which the cross connecting member 100 is fastened to the joint housing 200 by a fastening means B therethrough according to embodiments of the present disclosure.

Referring to the drawing, the cross connecting member 100 is hollow and has a boss 120 formed transversely at the center of the hollow. An internal reinforcement rib 130 is formed between the boss 120 and the inner surface of the cross connecting member 100.

The fastening means B is fastened to the center of the boss 120 by passing through the joint housing 200.

The fastening means B may be a bolt. The joint housing 200 may have a fastening hole H formed on the side thereof so that the bolt is fastened to the boss 120 through the joint housing 200. In addition, the boss 120 may have a fastening hole H formed in the center thereof so that the bolt is bolted to the boss 120.

That is, when the bolt is inserted into and bolted to the fastening hole H formed on the side of the joint housing 200 with the cross connecting member 100 fitted to the inner surface of the joint housing 200, the body of the bolt is fastened to the fastening hole H formed in the boss 120 so that the cross connecting member 100 and the joint housing 200 are integrated. In this case, since the fastening force of the bolt is distributed to the internal reinforcement rib 130 through the boss 120, it is possible to further increase the combined bearing force of that connection.

In addition, one end of the internal reinforcement rib 130 is connected to the outer peripheral surface of the boss 120 and the other end thereof is connected between the adjacent branch parts no.

That is, when the cross connecting member 100 has the branch parts 110 branched in three directions as illustrated in FIG. 5, the end of the internal reinforcement ribs 130 is connected to the boundary of the adjacent two branch parts 110. Thus, the internal reinforcement rib 130 supports the inside of the cross connecting member 100 more stably and uniformly to further improve the rigidity and strength of the cross connecting member 100.

For reference, the boss 120 may have a different thickness according to the connection of the cross connecting member 100 and the joint housing 200 or the condition such as a desired cost or weight. In addition to the boss 120, the cross connecting member 100 may have a different thickness that defines the external appearance thereof.

Meanwhile, in embodiments of the present disclosure, the frame member coupled to each member fastening part 220 may have a tubular shape that is closed in cross-section or a tubular shape that is open at one surface thereof.

That is, the tubular frame member having a tubular shape that is closed in cross-section may be used for a portion required for relatively high strength and rigidity in order to form the main frames of the vehicle body 1, and the tubular frame member having a tubular shape that is open at one surface thereof may be used for remaining portions of the vehicle body 1.

For example, referring to FIG. 2, all of the front pillar member 10, the cowl connecting member 20, and the side reinforcement member 30 may have a tubular shape that is closed in cross-section.

As another example, referring to FIGS. 7 and 8, the front pillar member 10 may have a tubular shape that is closed in cross-section and the rear pillar member 40 may have a tubular shape that is open at one surface thereof.

For example, the open frame member has a "⊏" shape in cross-section perpendicular to the longitudinal direction thereof so that the frame member has a structure in which three surfaces on the circumference thereof are closed and one surface thereof is open.

However, each of the open frame member and the closed frame member is closed at the opposing ends thereof, in which case the frame member may be fastened to other frame members by bolts or rivets through the closed ends of the frame member with the closed ends in surface contact with the sides of the other frame members.

In addition, each of the member fastening parts 220 has a tubular shape that is open at one end thereof, and the end of the frame member is fitted into the member fastening part 220.

A fastening means B may be fastened to the side of the frame member by passing through the side of the member fastening part 220.

The fastening means B may be a bolt. The member fastening part 220 and the associated frame member may have fastening holes H formed on the respective sides thereof so that the bolt is fastened through the member fastening part 220 and the associated frame member.

As described above, according to embodiments of the present disclosure, the cross connecting member 100 may be fitted into the fastening guide grooves 210 formed in a center of the joint housing 200. Moreover, the frame member having closed cross-sections may be fitted into the member fastening part 220 having an open cross-section. Therefore, the open cross-sections of the fastening guide groove 210 and the member fastening part 220 may be filled with the cross connecting member 100 and the frame member, forming a closed cross-section structure.

Therefore, although the joint housing 200 includes the member fastening part 220 having open cross-sections, which is relatively low in material cost and in rigidity in comparison to the member fastening part 220 having closed cross-sections, it is possible to increase the coupling rigidity and strength of the corresponding connections. Therefore, the rigidity and strength of those connections of the joints can be enhanced at low cost.

Meanwhile, in embodiments of the present disclosure, an external reinforcement rib 230 may be formed between the adjacent member fastening parts 220.

Preferably, the external reinforcement rib 230 may be formed between the adjacent member fastening parts 220 that form an obtuse angle of 90° or more.

For example, referring to FIG. 5, the external reinforcement rib 230 may be formed between the outer surface of the member fastening part 220 to which the front end of the front pillar member 10 is coupled and the outer surface of the member fastening part 220 to which the front end of the side reinforcement member 30 is coupled.

As another example, referring to FIG. 8, the external reinforcement rib 230 may be formed between the outer surface of the member fastening part 220 to which the rear end of the front pillar member 10 is coupled and the outer surface of the member fastening part 220 to which the front end of the rear pillar member 40 is coupled.

Since the external reinforcement rib 230 is formed between the member fastening parts 220 as described above, it is possible to enhance the rigidity of the joint housing 200 formed with the member fastening parts 220.

In addition, in embodiments of the present disclosure, a portion of the inner wall 200a of the joint housing 200 facing the outer surface of the cross connecting member 100 may be spaced apart from the cross connecting member 100, thereby defining a first buffer space 240.

For example, referring to FIG. 5, the first buffer space 240 may be defined between one surface of the branch part no facing the front pillar member 10 and one surface of the branch part 110 facing the side reinforcement member 30, and the inner wall 200a of the joint housing 200 facing the surfaces, which are spaced apart from each other.

That is, when a predetermined impact force is transmitted to the cowl member, the impact force is partially absorbed through the first buffer space 240. Therefore, it is possible to reduce the transmission of the impact force to the members connected to the cowl member.

In addition, in embodiments of the present disclosure, the inner wall 200a of the joint housing 200 surrounding the branch parts no may be spaced apart from the outer wall 200b of the joint housing 200 forming the bottom surfaces of the member fastening parts 220, thereby defining a second buffer space 250.

For example, referring to FIG. 5, the second buffer space 250 may be defined between the outer wall 200b of the upper member fastening part 220 to which the front pillar member 10 is coupled, and the inner wall 200a of the joint housing 200 facing the outer wall 200b while having the fastening guide grooves 210.

In addition, the second buffer space 250 may be defined between the outer wall 200b of the front lower member fastening part 220 to which the cowl connecting member 20 is coupled, and the inner wall 200a of the joint housing 200 facing the outer wall 200b. In addition, the second buffer space 250 may be defined between the outer wall 200b of the rear lower member fastening part 220 to which the side reinforcement member 30 is coupled, and the inner wall 200a of the joint housing 200 facing the outer wall 200b.

That is, when a predetermined impact force is transmitted to the members coupled to the joint housing 200, the impact force is partially absorbed through the second buffer space 250. Therefore, it is possible to reduce the transmission of the impact force to other members as well as the cross connecting member 100.

Figure 10:
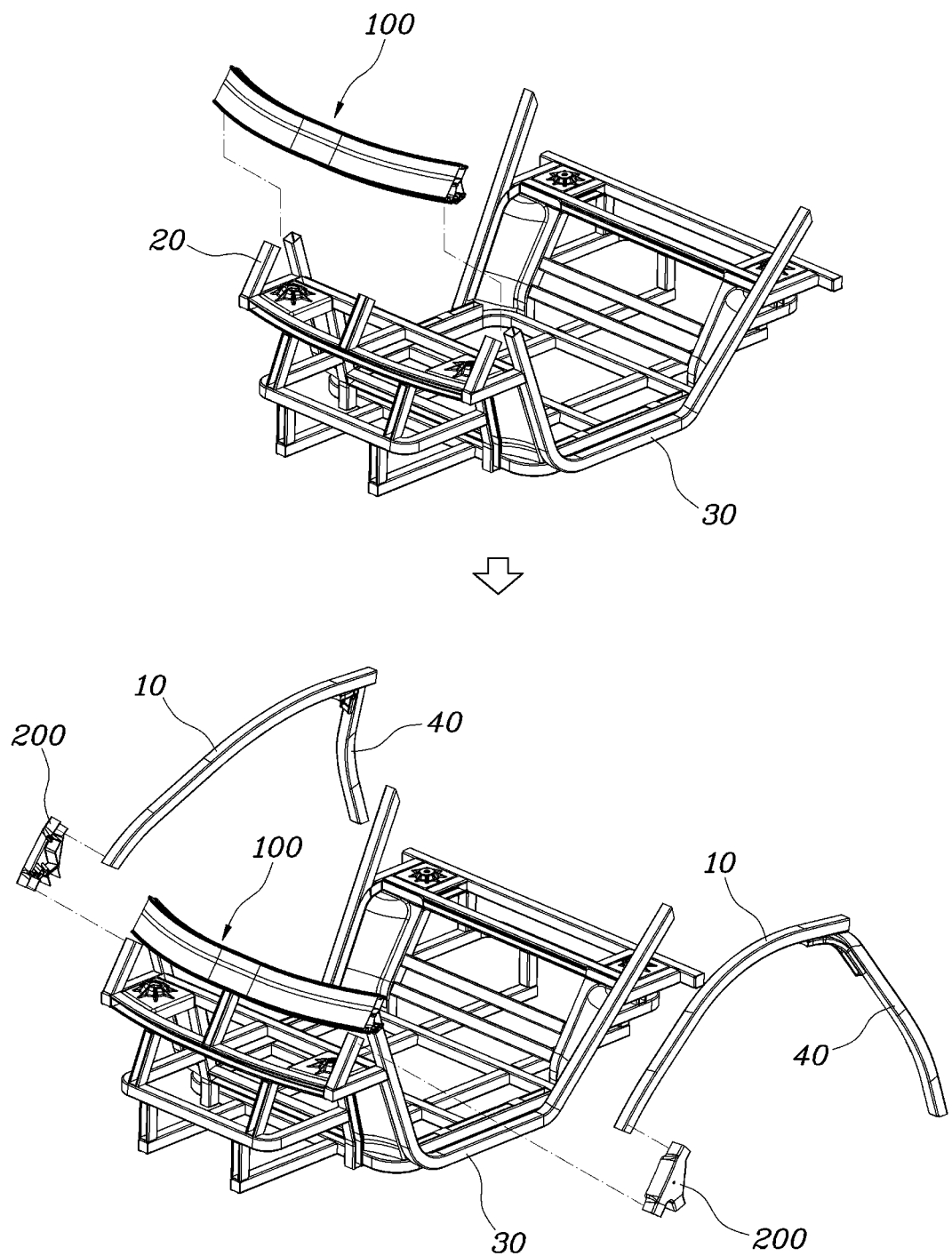
FIG. 10 is a view for explaining an assembly process of the cross connecting member and the joint housing according to embodiments of the present disclosure.

FIG. 10 is a view for explaining an assembly process of the cross connecting member 100 and the joint housing 200 according to embodiments of the present disclosure.

The process of coupling the cross connecting member 100 and the joint housing 200 will be schematically described with reference to the drawing. First, after the cowl member is made by extrusion molding and the joint housing 200 is made by die casting, the cowl member is positioned in the front of the vehicle body 1.

Next, the end of the cowl member slides and is fitted into the associated one of the fastening guide grooves 210 formed in the joint housing 200, and the cowl member is bolted by the bolt passing through the side of the joint housing 200.

At the same time, the upper end of the cowl connecting member 20 and the front end of the side reinforcement member 300 are inserted into the member fastening parts 220 branched from the lower end of the joint housing 200, and the cowl connecting member 20 and the side reinforcement member 300 are bolted by the bolts passing through the sides of the member fastening parts 220.

Next, the front end of the front pillar member 10 is inserted into the member fastening part 220 branched from the upper end of the joint housing 200, and the front pillar member 10 is bolted by the bolt passing through the side of the member fastening part 220.

As described above, by assembling the members coupled to the joint housing 200 as well as the cross connecting member 100 including the cowl member by bolting or riveting in embodiments of the present disclosure, large-scale equipment such as press plants, body welding plants, and painting plants is unnecessary. Therefore, it is possible to cope with the smart factory environment and of course to simplify the assembly of the vehicle body for an improvement in assembly capability. In addition, it is possible to significantly enhance the torsional rigidity of the assembled parts and to maintain the strength and rigidity of the vehicle body 1.

In particular, it is possible to enhance the coupling rigidity and strength of the main connections required for the connection rigidity and strength of the vehicle by fitting the cross connecting member 100 into the joint housing 200 while branching the cross connecting member 100 and the joint housing 200 toward the individual members that are fitted thereinto so that the main connections of the vehicle body 1 are interconnected by fitting and jointing.

Although the preferred embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A vehicle body comprising:
a cross connecting member formed in a transverse direction of the vehicle body and having branch parts branched from its outer surface; and
a joint housing having a tubular shape that is fitted to and surrounds the branch parts so that the joint housing is fastened to an end of the cross connecting member, the joint housing having member fastening parts extending from portions into which the branch parts are fitted so that frame members are fastened to the member fastening parts.

2. The vehicle body according to claim 1, wherein the joint housing has fastening guide grooves formed on its inner surface so as to correspond to outer surfaces of the branch parts, so that the branch parts are fitted into the fastening guide grooves.

3. The vehicle body according to claim 2, wherein each of the branch parts and an associated one of the fastening guide grooves have concave and convex portions or convex and concave portions formed on the outer surface of the branch part and the inner surface of the fastening guide groove, respectively, the concave and convex portions or the convex and concave portions corresponding to and being fitted to each other.

4. The vehicle body according to claim 3, wherein:
at least one of the branch parts has a center concave portion recessed from a center of its end and an associated one of the fastening guide grooves has a center convex portion protruding from its inner surface and corresponding to the center concave portion; and
each of the other branch parts has side convex portions extending from both sides of its end and an associated one of the fastening guide grooves has side concave portions recessed from its inner surface and corresponding to the side convex portions.

5. The vehicle body according to claim 1, wherein:
the cross connecting member is hollow and has a boss formed transversely at a center of the hollow;
an internal reinforcement rib is formed between the boss and an inner surface of the cross connecting member; and
a fastening means is fastened to a center of the boss by passing through the joint housing.

6. The vehicle body according to claim 5, wherein a first end of the internal reinforcement rib is connected to an outer peripheral surface of the boss and a second end of the internal reinforcement rib is connected between the branch parts adjacent to each other.

7. The vehicle body according to claim 1, wherein:
each of the frame members has a tubular shape that is closed in cross-section;
each of the member fastening parts has a tubular shape that is open at one surface thereof, so that each of the frame members is fitted into an associated one of the member fastening parts; and
a fastening means is fastened to a side of the frame member by passing through a side of the member fastening part.

8. The vehicle body according to claim 1, wherein:
each of the frame members has a tubular shape that is open at one surface thereof;
each of the member fastening parts has a tubular shape that is open at one surface thereof, so that each of the frame members is fitted into an associated one of the member fastening parts; and
a fastening means is fastened to a side of the frame member by passing through a side of the member fastening part.

9. The vehicle body according to claim 1, wherein an external reinforcement rib is formed between the member fastening parts adjacent to each other.

10. The vehicle body according to claim 1, wherein a portion of an inner wall of the joint housing facing the outer surface of the cross connecting member is spaced apart from the cross connecting member, thereby defining a first buffer space.

11. The vehicle body according to claim 1, wherein an inner wall of the joint housing surrounding the branch parts is spaced apart from an outer wall of the joint housing forming bottom surfaces of the member fastening parts, thereby defining a second buffer space.

12. The vehicle body according to claim 1, wherein the cross connecting member gradually increases in cross-sectional size from a center thereof toward both ends thereof.

13. A vehicle body comprising:
a cross connecting member formed in a transverse direction of the vehicle body;
branch parts extending from an outer surface of the cross connecting member;
a joint housing fitted to an end of the cross connecting member, the joint housing having fastening guide grooves formed on an inner surface, the fastening guide grooves corresponding to outer surfaces of the branch parts;
member fastening parts extending outward from the joint housing; and
frame members fastened to the member fastening parts.

14. The vehicle body of claim 13, wherein the branch parts extend in three directions from the outer surface of the cross connecting member.

15. The vehicle body of claim 13, wherein the cross connecting member has a first cross-sectional size at a center of the cross connecting member and a second cross-sectional size at each end of the cross connecting member, wherein the cross-sectional size gradually increases from the center to each end of the cross connecting member.

16. The vehicle body of claim 13, wherein the cross connecting member is a cowl member connected laterally to a lower end of a windshield at a front end of the vehicle body, and wherein the frame members comprise:
 a front pillar member extending upward from a front end of the vehicle body toward a roof of the vehicle body;
 a cowl connecting member connected to a suspension mount in the front end of the vehicle body and extending upward toward the joint housing; and
 a side reinforcement member connected to a side of a center floor on a bottom of the vehicle body and extending from the front end of the vehicle body to a rear end of the vehicle body.

17. The vehicle body of claim 13, wherein the cross connecting member is a rear roof member, and wherein the frame members comprise:
 a front pillar member extending upward from a front end of the vehicle toward a roof; and
 a rear pillar member extending upward from a rear end of the vehicle toward the roof, wherein the rear roof member is connected laterally between the front pillar member and the rear pillar member.

18. The vehicle body of claim 13, wherein the cross connecting member has a hollow interior region, the vehicle body further comprising:
 a boss formed transversely at a center of the hollow interior region;
 an internal reinforcement rib formed between the boss and an inner surface of the cross connecting member; and
 a fastener extending through a fastening hole of the joint housing and fastened to a center of the boss.

19. A vehicle body comprising:
 a cross connecting member positioned in a transverse direction of the vehicle body, the cross connecting member having a hollow interior region and an outer surface of the cross connecting member having a shape;
 a boss formed transversely at a center of the hollow interior region of the cross connecting member;
 an internal reinforcement rib formed between the boss and an inner surface of the cross connecting member;
 a first fastening hole extending through a center of the boss;
 a joint housing fitted over an end of the cross connecting member, an interior portion of the joint housing having a shape corresponding to the shape of the outer surface of the cross connecting member;
 a second fastening hole extending through the joint housing and aligned with the first fastening hole;
 member fastening parts extending outward from the joint housing; and
 frame members fastened to the member fastening parts.

20. The vehicle body of claim 19, wherein the frame members comprise:
 a front pillar member, a cowl connecting member, and a side reinforcement member; or
 the front pillar member and a rear pillar member.

* * * * *